(12) United States Patent
Liang

(10) Patent No.: US 11,054,684 B2
(45) Date of Patent: Jul. 6, 2021

(54) BACKLIGHT MODULE AND DISPLAY DEVICE

(71) Applicants: HKC Corporation Limited, Guangdong (CN); Chongqing HKC Optoelectronics Technology Co., Ltd., Chongqing (CN)

(72) Inventor: Shuozhen Liang, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 93 days.

(21) Appl. No.: 16/292,359

(22) Filed: Mar. 5, 2019

(65) Prior Publication Data

US 2020/0064676 A1  Feb. 27, 2020

Related U.S. Application Data

(63) Continuation of application No. PCT/CN2018/117063, filed on Nov. 23, 2018.

(30) Foreign Application Priority Data

Aug. 27, 2018  (CN) .......................... 201821381765.4

(51) Int. Cl.
*G02F 1/00*  (2006.01)
*G02F 1/1333*  (2006.01)
(Continued)

(52) U.S. Cl.
CPC ..... *G02F 1/133308* (2013.01); *G02B 6/0051* (2013.01); *G02B 6/0053* (2013.01);
(Continued)

(58) Field of Classification Search
CPC .. G02B 6/0051; G02B 6/0053; G02B 6/0055; G02B 6/0088; G02F 1/133528;
(Continued)

(56) References Cited

U.S. PATENT DOCUMENTS

2013/0215359 A1* 8/2013 Chun ................. G02F 1/133308
349/58
2016/0187570 A1* 6/2016 Jung ................. G02F 1/133308
362/609
(Continued)

FOREIGN PATENT DOCUMENTS

CN  204287656 U  4/2015
CN  104696826 A  6/2015
(Continued)

*Primary Examiner* — Y M. Quach Lee

(57) ABSTRACT

Disclosed are a backlight module and a display device. The backlight module includes: an optical film set; a light guide plate; a reflector plate; and a back plate. The back plate includes a base plate and a support portion disposed on a periphery of the base plate. The reflector plate is disposed on the base plate, the light guide plate is disposed on a side of the reflector plate away from the base plate, and the optical film set is disposed on a side of the light guide plate away from the reflector plate, one end of the support portion located in the same plane as the optical film set away from the base plate.

19 Claims, 1 Drawing Sheet

(51) Int. Cl.
*F21V 8/00* (2006.01)
*G02F 1/1335* (2006.01)

(52) U.S. Cl.
CPC ..... *G02B 6/0088* (2013.01); *G02F 1/133528* (2013.01); *G02F 1/13332* (2021.01); *G02F 1/133314* (2021.01)

(58) Field of Classification Search
CPC .......... G02F 2001/133314; G02F 2001/13332; G02F 1/133308
See application file for complete search history.

(56) References Cited

U.S. PATENT DOCUMENTS

2016/0327733 A1* 11/2016 Liu ...................... G02B 6/0088
2018/0088394 A1* 3/2018 Notoshi ............ G02F 1/133308

FOREIGN PATENT DOCUMENTS

| | | |
|---|---|---|
| CN | 105090813 A | 11/2015 |
| CN | 204806292 U | 11/2015 |
| CN | 205983329 U | 2/2017 |
| TW | M402439 U | 4/2011 |

* cited by examiner

BACKLIGHT MODULE AND DISPLAY DEVICE

CROSS REFERENCE TO RELATED APPLICATIONS

This application a Continuation Application of PCT Application No. PCT/CN2018/117063 filed on Nov. 23, 2018, which claims the benefit of Chinese patent application No. 201821381765.4 titled "BACKLIGHT MODULE AND DISPLAY DEVICE" applied on Aug. 27, 2018, the disclosure of which is incorporated herein by reference in its entirety.

FIELD OF THE DISCLOSURE

The present application relates to the field of the display device, and in particular, to a backlight module and a display device.

BACKGROUND OF THE DISCLOSURE

LCD TVs are televisions that use liquid crystal displays, referred to as LCD (Liquid Crystal Display). In order to achieve ultra-thin, the thickness of LCD TVs should be minimized. The overall thickness of LCD TVs is increased due to the plastic frame, which cannot meet the ultra-thin conditions. The statements herein merely provide background information related to the present application and do not necessarily constitute prior art.

SUMMARY OF THE DISCLOSURE

The main object of the present application is to provide a backlight module designed to make the display device thinner.

To achieve the above purpose, the backlight module proposed by the present application includes:
  an optical film set;
  a light guide plate;
  a reflector plate; and
  a back plate including a base plate and a support portion disposed on a periphery of the base plate. The reflector plate is disposed on the base plate, the light guide plate is disposed on a side of the reflector plate away from the base plate, and the optical film set is disposed on a side of the light guide plate away from the reflector plate, one end of the support portion located in the same plane as the optical film set away from the base plate.

Optionally, the optical film set includes an upper prism, a lower prism and a diffusion sheet which are sequentially stacked. The upper prism and one end of the support portion away from the base plate are in the same plane facing away from the surface of the lower prism. The diffusion sheet is connected to the light guide plate facing away from the surface of the lower prism.

Optionally, the support portion includes a connecting plate and a supporting plate connected to the connecting plate at an included angle. The connecting plate is connected to the base plate at an included angle. The support plate is disposed in parallel with the base plate, and the base plate, the support plate and the connecting plate collectively enclose to form a cavity, and the upper prism, the lower prism, the diffusion sheet, the light guide plate and the reflector plate are all accommodated in the cavity.

Optionally, the backlight module further includes a light source disposed on the connecting plate or disposed on a surface of the reflector plate facing away from the base plate.

Optionally, the light source is an LED lamp, a cold cathode tube fluorescent lamp or electroluminescence.

Optionally, the optical film set, the light guide plate, and the reflector plate are sequentially stacked.

Optionally, the base plate and the support portion enclose to form a cavity, and the optical film set, the light guide plate and the reflector plate are all accommodated in the cavity.

The present application also provides a backlight module, including:
  an optical film set;
  a light guide plate;
  a reflector plate; and
  a back plate including a base plate and a support portion disposed on a periphery of the base plate. The reflector plate is disposed on the base plate, the light guide plate is disposed on a side of the reflector plate away from the base plate, and the optical film set is disposed on a side of the light guide plate away from the reflector plate, one end of the support portion located in the same plane as the optical film set away from the base plate;
  the optical film set includes an upper prism, a lower prism and a diffusion sheet which are sequentially stacked. The upper prism and one end of the support portion away from the base plate are in the same plane facing away from the surface of the lower prism. The diffusion sheet is connected to the light guide plate facing away from the surface of the lower prism;
  the support portion includes a connecting plate and a supporting plate connected to the connecting plate at an included angle. The connecting plate is connected to the base plate at an included angle. The support plate is disposed in parallel with the base plate, and the base plate, the support plate and the connecting plate collectively enclose to form a cavity, and the upper prism, the lower prism, the diffusion sheet, the light guide plate and the reflector plate are all accommodated in the cavity;
  the backlight module further includes a light source disposed on the connecting plate or disposed on a surface of the reflector plate facing away from the base plate.

The present application also provides a display device, including a display component and a backlight module. The display component is mounted on the support portion, and the display component abuts against a surface of the optical film set facing away from the light guide plate. The backlight module is the backlight module described above.

Optionally, the display component includes an upper polarizer, a glass substrate and a lower polarizer which are sequentially stacked. The lower polarizer is mounted on the surface of the glass substrate facing away from the support portion and is in contact with the surface of the optical film set facing away from the light guide plate.

Optionally, the display device further includes a flexible printed circuit, the flexible printed circuit has one end connected to the glass substrate, and the other end thereof is connected to the base plate.

Optionally, the glass substrate includes a upper glass substrate and a lower glass substrate sequentially stacked. The lower glass substrate has a length greater than that of the upper glass substrate. One end of the flexible printed circuit is connected to the lower glass substrate.

Optionally, the display device further includes a front housing. The front housing includes a first frame and a second frame connected to the first frame at an included angle. The first frame abuts against the surface of the display component facing away from the optical film set. The second frame is provided with a buckle hole, and the support portion is convexly provided with a buckle. The second frame is detachably connected to the support portion by the cooperation of the buckle hole and the buckle.

The backlight module of the present application includes an optical film set, a light guide plate, a reflector plate and a back plate. The support portion is in the same plane as the optical film set by including the base plate and the support portion in the back plate. The display component is supported by the support portion and the optical film group jointly, and the overall structure is compact. Since the plastic frame is not required to additionally support the display component, the display device of the present application has a thin thickness and is excellent in overall appearance.

BRIEF DESCRIPTION OF THE DRAWINGS

In order to illustrate the technical schemes in the embodiments of the present application or in the prior art more clearly, the drawings which are required to be used in the description of the embodiments or the prior art are briefly described below. It is obvious that the drawings described below are only some embodiments of the present application. It is apparent to those of ordinary skill in the art that other drawings may be obtained based on the structures shown in accompanying drawings without inventive effort.

The object realization, function characteristics and advantages of this application will be further described in reference to embodiments and accompanying drawings.

DETAILED DESCRIPTION OF THE EMBODIMENTS

The technical schemes of embodiments of the present disclosure will be clearly and completely described in the following with reference to the accompanying drawings. It is obvious that the embodiments to be described are only a part rather than all of the embodiments of the present disclosure. All other embodiments obtained by persons of ordinary skill in the art based on the embodiments of the present disclosure without creative efforts shall fall within the scope of protection of the present disclosure.

It is to be understood that, all of the directional instructions in the embodiments of the present disclosure (such as top, down, left, right, front, back . . . ) can only be used for explaining relative position relations, moving condition of the elements under a special form (referring to figures), and so on, if the special form changes, the directional instructions changes accordingly.

In the present disclosure, the terms "connection", "fixation" and the like should be broadly understood, unless otherwise clearly indicated and specified, for example, "connection" may refer to a fixed connection, or a detachable connection, or an integration, or a mechanical connection, or an electric connection, or a direct connection, or an indirect connection realized through an intermediate medium, or an internal communication or an interaction relationship of two elements, unless otherwise indicated clearly. Specific meanings of the foregoing terms in the present disclosure can be appreciated by persons of ordinary skill in the art according to specific circumstances.

In addition, the descriptions, such as the "first", the "second" in the present disclosure, can only be used for describing the aim of description, and cannot be understood as indicating or suggesting relative importance or impliedly indicating the number of the indicated technical character. Thus, features defined with "first", "second" may include at least one such feature, either explicitly or implicitly. In addition, technical solutions of different embodiments can be combined with each other, however the technical solutions must base on that persons of ordinary skill in the art can realize the technical solutions, when the combination of the technical solutions occurs contradiction or cannot realize, it should consider that the combination of the technical solutions is impractical, and is not contained in the protection scope required by the present disclosure.

The present disclosure proposes a backlight module, which may be an edge-lit backlight module or a direct type backlight module, and the backlight module should be configured as a display device 100.

Figure 1:
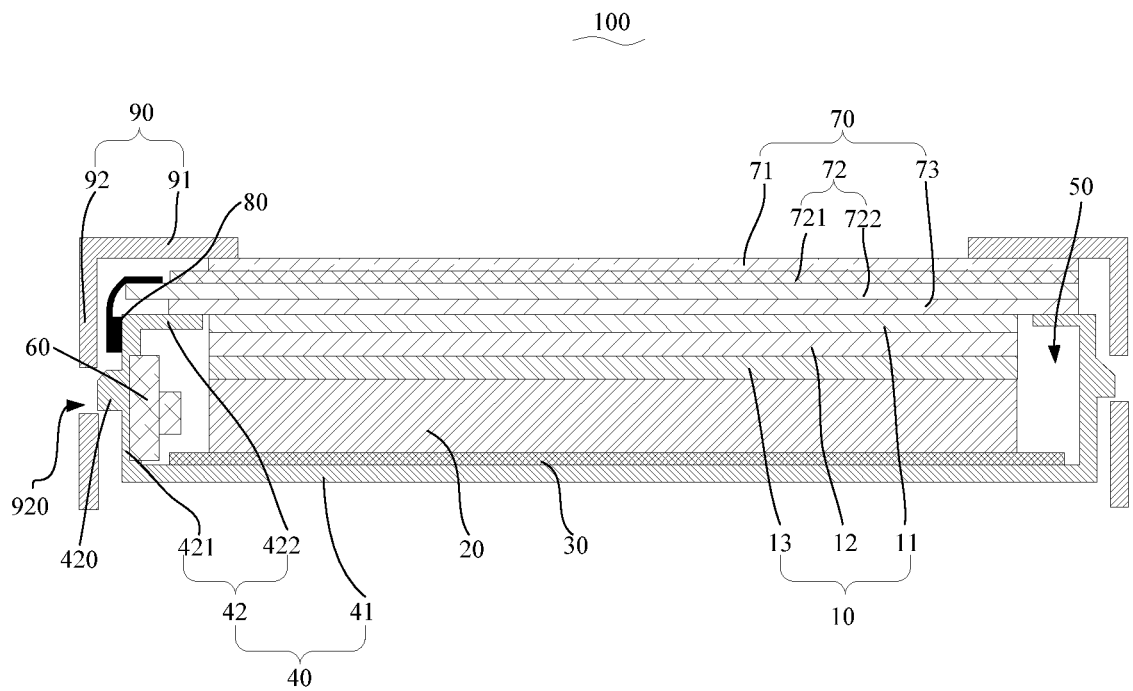
FIG. 1 is a cut-away view of an embodiment of a display device of the present application.
Figure 2:
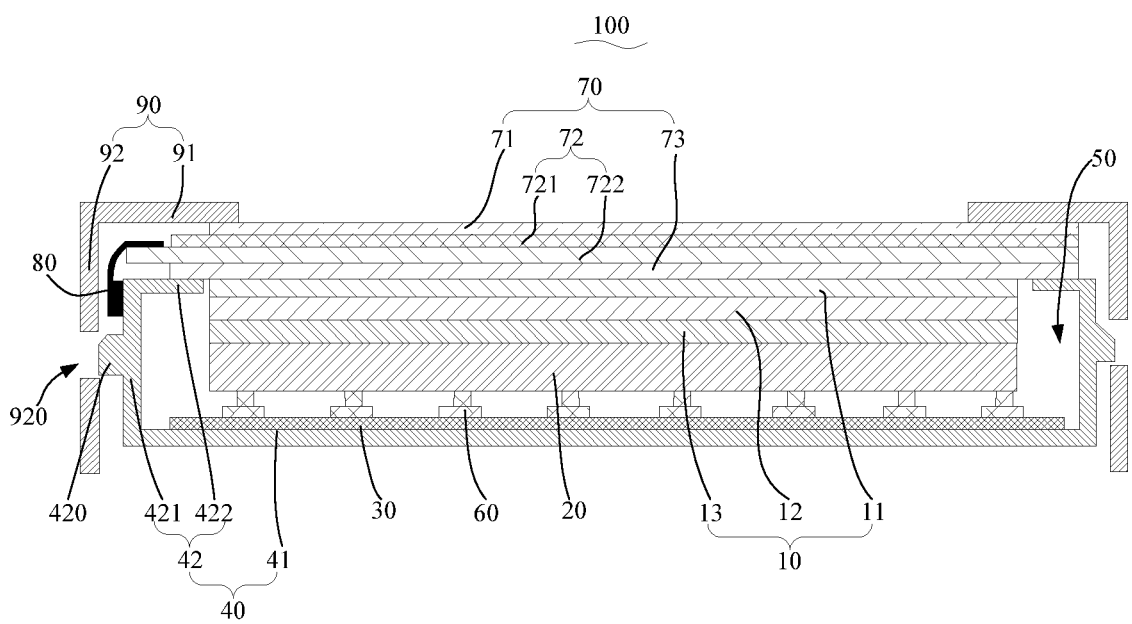
FIG. 2 is a cut-away view of another embodiment of a display device of the present application.

Referring to FIG. 1 and FIG. 2, in the embodiment of the present application, the backlight module includes:

an optical film set 10;

a light guide plate 20;

a reflector plate 30; and a back plate 40 including a base plate 41 and a support portion 42 disposed on a periphery of the base plate 41. The reflector plate 30 is disposed on the base plate 41, the light guide plate 20 is disposed on a side of the reflector plate 30 away from the base plate 4l, and the optical film set 10 is disposed on a side of the light guide plate 20 away from the reflector plate 30, one end of the support portion 42 located in the same plane as the optical film set 10 away from the base plate 41.

In an embodiment, the optical film set 10, the light guide plate 20, and the reflector plate 30 are sequentially stacked. The base plate 41 and the support portion 42 enclose to form a cavity 50, and the optical film set 10, the light guide plate 20 and the reflector plate 30 are all accommodated in the cavity 50. The reflector plate 30 needs to have a certain flexibility in order to fold it, and the reflector plate 30 also has the function of opaque and reflected light. The reflector plate 30 is made of metal or plastic with reflection functions. The optional reflector plate 30 of this embodiment is a PET film (Polyester Film). The material of the light guide plate 20 is preferably with better strength. The optional light guide plate 20 of the present embodiment is made of tempered glass which has better bearing capacity. The optical film set 10 is configured to increase the front view lightness of the display device 100.

The back plate 40 includes a base plate 41 and a support portion 42 disposed on the periphery of the base plate 41. The end of the support portion 42 away from the base plate 41 is in the same plane as the optical film set 10, ensuring the support portion 42 being flush with the optical film set 10, and supporting the display component 70 jointly to eliminate the need for a plastic frame.

The backlight module of the present application includes an optical film set 10, a light guide plate 20, a reflector plate 30 and a back plate 40. The support portion 42 is in the same plane as the optical film set 10 by including the base plate 41 and the support portion 42 in the back plate 40. The display component 70 is supported by the support portion 42 and the optical film set 10 jointly, and the overall structure is compact. Since the plastic frame is not required to additionally support the display component 70, the display device 100 of the present application has a thin thickness and is excellent in overall appearance.

Referring to FIG. 1 and FIG. 2, the optical film set 10 includes an upper prism 11, a lower prism 12 and a diffusion sheet 13 which are sequentially stacked. The upper prism 11 and one end of the support portion 42 away from the base plate 41 are in the same plane facing away from the surface of the lower prism 12. The diffusion sheet 13 is connected to the light guide plate 20 facing away from the surface of the lower prism 12.

In the present embodiment, under a certain light source output, the front view lightness, or the axial lightness, of the display device 100 will be improved by the upper prism 11, the lower prism 12, and the diffusion sheet 13. Among which, the upper prism 11, the lower prism 12, and the diffusion sheet 13 have the same size. The surface of the upper prism 11 facing away from the lower prism 12 is in the same plane as the end of the support portion 42 away from the base plate 41, so that the support portion 42 and the upper prism 11 jointly support the display component 70, and the structure is compact.

In an embodiment, the support portion 42 includes a connecting plate 421 and a supporting plate 422 connected to the connecting plate 421 at an included angle. The connecting plate 421 is connected to the base plate 41 at an included angle. The support plate 422 is disposed in parallel with the base plate 41, and the base plate 41, the support plate 422 and the connecting plate 421 collectively enclose to form a cavity 50, and the upper prism 11, the lower prism 12, the diffusion sheet 13, the light guide plate 20 and the reflector plate 30 are all accommodated in the cavity 50.

In the present embodiment, the support portion 42 includes a connecting plate 421 and a supporting plate 422 connected to the connecting plate 421 at an included angle. The connecting plate 421 is connected to the base plate 41 at an included angle, and the supporting plate 422 is disposed in parallel with the base plate 41. The included angle between the connecting plate 421 and the base plate 41 and the included angle between the connecting plate 421 and the supporting plate 422 are complementary. In the present embodiment, the optional connecting plate 421 and the base plate 41 are disposed at 90 degrees, and the connecting plate 421 and the supporting plate 422 are disposed at 90 degrees. In addition, by connecting the connecting plate 421 to the supporting plate 422 at an included angle, it is also possible to prevent the reflector plate 30 from leaking light, so that the user has a better visual experience.

Referring to FIG. 1 and FIG. 2, the backlight module further includes a light source 60 disposed on the connecting plate 421 or disposed on a surface of the reflector plate 30 facing away from the base plate 41.

In the present embodiment, the light source 60 is disposed in two positions, an edge-lit and a direct type. The light source 60 is an LED lamp, a cold cathode tube fluorescent lamp or electroluminescence, which is not limited herein. Referring to FIG. 1, which is an edge-lit. In this case, the light source 60 is disposed on the connecting plate 421, and the light source 60 is disposed on the side. Referring to FIG. 2, which is a direct type. In this case, the light source 60 is disposed on the surface of the reflector plate 30 facing away from the base plate 41, and the light source 60 is interposed between the light guide plate 20 and the reflector plate 30.

The present application also provides a display device 100, including a backlight module, the specific structure of which is with reference to the above embodiments. Since the display device 100 adopts all the technical schemes of all the above embodiments, it has at least all the effects brought about by the technical schemes of the above embodiments, and details are not described herein again.

Among which, the display device 100 includes a display component 70 and a backlight module. The display component 70 is mounted on the support portion 42, and the display component 70 abuts against a surface of the optical film set 10 facing away from the light guide plate 20.

In the present embodiment, the display component 70 refers to an LCD display component that integrates a glass and an LCD (Liquid Crystal Display) driver. The display component 70 is mounted on the support portion 42, and the display component 70 abuts against the surface of the optical film set 10 facing away from the light guide plate 20, and the display component 70 is supported by the support portion 42 and the optical film set 10 jointly.

Referring to FIG. 1 and FIG. 2, the display component 70 includes an upper polarizer 71, a glass substrate 72 and a lower polarizer 73 which are sequentially stacked. The lower polarizer 73 is mounted on the surface of the glass substrate 72 facing away from the support portion 42 and is in contact with the surface of the optical film set 10 facing away from the light guide plate 20.

It can be understood that the display component 70 includes an upper polarizer 71, a glass substrate 72 and a lower polarizer 73 which are sequentially stacked, and the upper polarizer 71 and the lower polarizer 73 function to filter out stray light and filter 99% of glare, which enhances visual acuity, increase color contrast and maximize visual comfort. The basic structure of the upper polarizer 71 and the lower polarizer 73 includes: the most intermediate PVA (polyvinyl alcohol), two layers of TAC (triacetate), PSA film (pressure sensitive adhesive), Release film and Protective film. Among which, the light transmission direction of the upper polarizer 71 is perpendicular to that of the lower polarizer 73. The upper polarizer 71 is disposed on a surface of the glass substrate 72 facing away from the light guide plate 20, and the length of the upper polarizer 71 is not greater than that of the glass substrate 72. The lower polarizer 73 is interposed between the glass substrate 72 and the optical film set 10.

Among which, the surface of the lower polarizer 73 facing away from the glass substrate 72 is mounted on the support portion 42 and abuts against the surface of the optical film set 10 facing away from the light guide plate 20, and the overall structure is compact.

In an embodiment, the display device 100 further includes a flexible printed circuit 80, the flexible printed circuit 80 has one end connected to the glass substrate 72, and the other end thereof is connected to the base plate 421.

In the present embodiment, the flexible circuit board 80 is a printed circuit made of a flexible insulating substrate. The printed circuit provides excellent electrical performance, which can meet the design requirements of a smaller and higher density installation, and also helps to reduce the assembly process and increase reliability. The flexible circuit board 80 is configured to connect the circuit region of the glass substrate 72 and the connection board 421 which is bent and disposed between the connecting plate 421 and the glass substrate 72.

In an embodiment, the glass substrate 72 includes a upper glass substrate 721 and a lower glass substrate 722 sequentially stacked. The lower glass substrate 722 has a length greater than that of the upper glass substrate 721. One end of the flexible printed circuit 80 is connected to the lower glass substrate 722.

In the present embodiment of the lower glass substrate 722 and the upper glass substrate 721, wherein liquid crystal molecules between the lower glass substrate 722 and the upper glass substrate 721 are provided. The lower glass substrate 722 and the upper glass substrate 721 are TFT (Thin Film Transistor) glass and CF (Color Filter) glass respectively. The portion where the lower glass substrate 722 overlaps the upper glass substrate 721 functions as a display screen. A portion of the lower glass substrate 722 that protrudes from the upper glass substrate 721 is provided with a circuit region (not shown) and a blank region (not shown), and the circuit region is configured to lay circuits, an dispose press-fit leads of IC (Integrated Circuit), and the flexible wiring board 80.

In an embodiment, the display device 100 further includes a front housing 90. The front housing 90 includes a first frame 91 and a second frame 92 connected to the first frame 91 at an included angle. The first frame 91 abuts against the surface of the display component 70 facing away from the optical film set 10. The second frame 92 is detachably connected to the support portion 42.

In the present embodiment, the front housing 90 needs to have better strength to better fix the display component 70, and the front housing 90 is made of metal or plastic. In this embodiment, the optional front housing 90 is made of a metal material. The front housing 90 includes a first frame 91 and a second frame 92 connected to the first frame 91 at an included angle. For convenient installation, the first frame 91 and the second frame 92 are disposed at right angles. Among which, the first frame 91 abuts against the surface of the display component 70 facing away from the optical film set 10, and the second frame 92 is detachably connected to the support portion 42. The detachable connection may be a screw connection or a snap connection, or an adhesive connection, which is not limited herein.

In order to prevent the first frame 91 from scratching the display component 70, a cushion (not shown) may be disposed between the first frame 91 and the display assembly 70, and the cushion is configured to protect the display component 70, preventing the display assembly 70 from directly contacting the first frame 91 by hard contact which results in damages, and the cushion is connected to the display component 70 by adhesives, so that the overall structure is more stable.

In an embodiment, the second frame 92 is provided with a buckle hole 920, the support portion 42 is convexly provided with a buckle 420. The second frame 92 is detachably connected to the support portion 42 by the cooperation of the buckle hole 920 and the buckle 420.

In the present embodiment, the second frame 92 is detachably connected to the support portion 42 by the cooperation of the buckle hole 920 and the buckle 420. The end of the buckle 420 facing the second frame 92 is provided with a guide surface for facilitating the snap connection between the second frame 92 and the support portion 42, which is more labor-saving.

The embodiments above are merely preferably embodiments of the present disclosure but are not to be construed as limiting the scope of the present disclosure, and any equivalent structural conversion devised based on the inventive concept of the present disclosure or using the drawing of the present disclosure, or a direct or indirect application of the present disclosure to another related technical field shall fall into the scope of protection of the present disclosure.

What is claimed is:

1. A backlight module, comprising:
    an optical film set;
    a light guide plate;
    a reflector plate; and
    a back plate including a base plate and a support portion disposed on a periphery of the base plate, the reflector plate is disposed on the base plate, the light guide plate is disposed on a side of the reflector plate away from the base plate, and the optical film set is disposed on a side of the light guide plate away from the reflector plate, a surface of one end of the support portion away from the base plate is coplanar with a surface of the optical film set away from the light guide plate, and the surface of the optical film set away from the light guide plate abuts against a display component.

2. The backlight module according to claim 1, wherein the optical film set comprises an upper prism, a lower prism and a diffusion sheet which are sequentially stacked, the upper prism and one end of the support portion away from the base plate are in the same plane facing away from the surface of the lower prism, the diffusion sheet is connected to the light guide plate facing away from the surface of the lower prism.

3. The backlight module according to claim 2, wherein the support portion comprises a connecting plate and a supporting plate connected to the connecting plate at an included angle, the connecting plate is connected to the base plate at an included angle, the support plate is disposed in parallel with the base plate, and the base plate, the support plate and the connecting plate collectively enclose to form a cavity, and the upper prism, the lower prism, the diffusion sheet, the light guide plate and the reflector plate are all accommodated in the cavity.

4. The backlight module according to claim 3, wherein the backlight module further comprises a light source disposed on the connecting plate or disposed on a surface of the reflector plate facing away from the base plate.

5. The backlight module according to claim 4, wherein the light source is an LED lamp, a cold cathode tube fluorescent lamp or electroluminescence.

6. The backlight module according to claim 1, wherein the optical film set, the light guide plate, and the reflector plate are sequentially stacked.

7. The backlight module according to claim 1, wherein the base plate and the support portion enclose to form a cavity, and the optical film set, the light guide plate and the reflector plate are all accommodated in the cavity.

8. A backlight module, comprising:
    an optical film set;
    a light guide plate;
    a reflector plate; and
    a back plate including a base plate and a support portion disposed on a periphery of the base plate, the reflector plate is disposed on the base plate, the light guide plate is disposed on a side of the reflector plate away from the base plate, and the optical film set is disposed on a side of the light guide plate away from the reflector plate, a surface of one end of the support portion away from the base plate is coplanar with a surface of the optical film set away from the light guide plate, and the surface of the optical film set away from the light guide plate abuts against a display component;
    the optical film set comprises an upper prism, a lower prism and a diffusion sheet which are sequentially stacked, the prism and one end of the support portion away from the base plate are in the same plane facing away from the surface of the lower prism, the diffusion sheet is connected to the light guide plate facing away from the surface of the lower prism;
    the support portion comprises a connecting plate and a supporting plate connected to the connecting plate at an included angle, the connecting plate is connected to the base plate at an included angle, the support plate is disposed in parallel with the base plate, and the base plate, the support plate and the connecting plate collectively enclose to form a cavity, and the upper prism, the lower prism, the diffusion sheet, the light guide plate and the reflector plate are all accommodated in the cavity;

the backlight module further comprises a light source disposed on the connecting plate or disposed on a surface of the reflector plate facing away from the base plate.

9. A display device, comprising: a display component and a backlight module, the backlight module comprising:
   an optical film set;
   a light guide plate;
   a reflector plate; and
   a back plate including a base plate and a support portion disposed on a periphery of the base plate, the reflector plate is disposed on the base plate, the light guide plate is disposed on a side of the reflector plate away from the base plate, and the optical film set is disposed on a side of the light guide plate away from the reflector plate, a surface of one end of the support portion away from the base plate is coplanar with a surface of the optical film set away from the light guide plate, and the surface of the optical film set away from the light guide plate abuts against the display component;
   the display component is mounted on the support portion.

10. The display device according to claim 9, wherein the display component comprises an upper polarizer, a glass substrate and a lower polarizer which are sequentially stacked, the lower polarizer is mounted on the surface of the glass substrate facing away from the support portion and is in contact with the surface of the optical film set facing away from the light guide plate.

11. The display device according to claim 10, wherein the display device further comprises a flexible printed circuit, the flexible printed circuit has one end connected to the glass substrate, and the other end thereof is connected to the connecting plate.

12. The display device according to claim 11, wherein the glass substrate comprises an upper glass substrate and a lower glass substrate sequentially stacked, the lower glass substrate has a length greater than that of the upper glass substrate, one end of the flexible printed circuit is connected to the lower glass substrate.

13. The display device according to claim 9, wherein the display device further comprises a front housing, the front housing comprises a first frame and a second frame connected to the first frame at an included angle, the first frame abuts against the surface of the display component facing away from the optical film set; the second frame is provided with a buckle hole, and the support portion is convexly provided with a buckle, the second frame is detachably connected to the support portion by the cooperation of the buckle hole and the buckle.

14. The display device according to claim 9, wherein the optical film set comprises an upper prism, a lower prism and a diffusion sheet which are sequentially stacked, the upper prism and one end of the support portion away from the base plate are in the same plane facing away from a surface of the lower prism, the diffusion sheet is connected to the light guide plate facing away from the surface of the lower prism.

15. The display device according to claim 14, wherein the support portion comprises a connecting plate and a supporting plate connected to the connecting plate at an included angle, the connecting plate is connected to the base plate at an included angle, the support plate is disposed in parallel with the base plate, and the base plate, the support plate and the connecting plate collectively enclose to form a cavity, and the upper prism, the lower prism, the diffusion sheet, the light guide plate and the reflector plate are all accommodated in the cavity.

16. The display device according to claim 15, wherein the backlight module further comprises a light source disposed on the connecting plate or disposed on a surface of the reflector plate facing away from the base plate.

17. The display device according to claim 15, wherein the light source is an LED lamp, a cold cathode tube fluorescent lamp or electroluminescence.

18. The display device according to claim 9, wherein the optical film set, the light guide plate, and the reflector plate are sequentially stacked.

19. The display device according to claim 9, wherein the base plate and the support portion enclose to form a cavity, and the optical film set, the light guide plate and the reflector plate are all accommodated in the cavity.

* * * * *